United States Patent
Yoon et al.

(10) Patent No.: US 9,233,878 B2
(45) Date of Patent: Jan. 12, 2016

(54) DIELECTRIC CERAMIC COMPOSITION AND MULTILAYER CERAMIC CAPACITOR CONTAINING THE SAME

(71) Applicant: SAMSUNG ELECTRO-MECHANICS CO., LTD., Suwon-Si, Gyeonggi-Do (KR)

(72) Inventors: Seok Hyun Yoon, Suwon-Si (KR); Jae Sung Park, Suwon-Si (KR); Soo Kyung Cho, Suwon-Si (KR); Doo Young Kim, Suwon-Si (KR); Chang Hoon Kim, Suwon-Si (KR)

(73) Assignee: SAMSUNG ELECTRO-MECHANICS CO., LTD., Suwon-Si, Gyeonggi-Do ( * ) Notice: Subject to any disclaimer, the term of this patent is extended or adjusted under 35 U.S.C. 154(b) by 0 days.

(21) Appl. No.: 14/317,965

(22) Filed: Jun. 27, 2014

(65) Prior Publication Data

US 2015/0299046 A1   Oct. 22, 2015

(30) Foreign Application Priority Data

Apr. 16, 2014   (KR) ........................ 10-2014-0045526

(51) Int. Cl.
| | |
|---|---|
| *H01G 4/10* | (2006.01) |
| *C04B 35/468* | (2006.01) |
| *C04B 35/475* | (2006.01) |
| *H01G 4/30* | (2006.01) |
| *H01G 4/12* | (2006.01) |

(52) U.S. Cl.
CPC ............ *C04B 35/468* (2013.01); *H01G 4/1227* (2013.01); *H01G 4/30* (2013.01)

(58) Field of Classification Search
CPC .............. H01G 4/1227; C04B 35/468; C04B 35/4682; C04B 35/475
See application file for complete search history.

(56) References Cited

U.S. PATENT DOCUMENTS

| 7,759,269 B2 * | 7/2010 | Takahashi et al. ............ 501/138 |
| 8,194,392 B2 * | 6/2012 | Malhan et al. ............. 361/321.4 |
| 8,518,292 B2 * | 8/2013 | Saito et al. ............. 252/62.9 PZ |

(Continued)

FOREIGN PATENT DOCUMENTS

| JP | 2011173776 A | 9/2011 |
| KR | 1999-0075846 A | 10/1999 |
| KR | 10-2007-0026399 A | 3/2007 |
| KR | 10-2013-0036595 A | 4/2013 |

OTHER PUBLICATIONS

H. Tanaka et al., "Growth of (111)-oriented BaTiO3-Bi(Mg0.5Ti0.5)O3 epitaxial films and their crystal structure and electrical property characterizations," Journal of Applied Physics, vol. 111, Issue 8, Apr. 2012.

(Continued)

*Primary Examiner* — Karl Group
(74) *Attorney, Agent, or Firm* — McDermott Will & Emery LLP

(57) ABSTRACT

A dielectric ceramic composition may include a base powder represented by (1-x) $BaTiO_3$-$xBiMO_3$ (M being configured of Mg and Ti) containing a first main component represented by $BaTiO_3$ and a second main component represented by $BiMO_3$, x satisfying $0.005 \leq x \leq 0.5$, and Some embodiments of the present disclosure may provide a novel dielectric ceramic composition capable of securing X8R temperature characteristics and reliability.

10 Claims, 3 Drawing Sheets

A – A'

(56) References Cited

U.S. PATENT DOCUMENTS

| | | |
|---|---|---|
| 2008/0253060 A1 | 10/2008 | Ito et al. |
| 2010/0328844 A1* | 12/2010 | Nishimura et al. ........ 361/321.5 |
| 2011/0002083 A1* | 1/2011 | Malhan et al. ............. 361/321.4 |
| 2013/0020525 A1* | 1/2013 | Saito et al. ............. 252/62.9 PZ |
| 2013/0056671 A1* | 3/2013 | Kubota et al. .......... 252/62.9 PZ |
| 2013/0083449 A1 | 4/2013 | Yoon et al. |

OTHER PUBLICATIONS

Korean Office Action dated Jun. 18, 2015 issued in corresponding Korean Patent Application No. 10-2014-0045526, with English translation.

* cited by examiner

DIELECTRIC CERAMIC COMPOSITION AND MULTILAYER CERAMIC CAPACITOR CONTAINING THE SAME

CROSS-REFERENCE TO RELATED APPLICATION

This application claims the benefit of Korean Patent Application No. 10-2014-0045526 filed on Apr. 16, 2014, with the Korean Intellectual Property Office, the disclosure of which is incorporated herein by reference.

BACKGROUND

The present disclosure relates to a novel dielectric ceramic composition having guaranteed X8R temperature characteristics and reliability, and a multilayer ceramic capacitor containing the same.

Generally, electronic components using ceramic materials, such as capacitors, inductors, piezoelectric elements, varistors, thermistors, and the like, include a ceramic body formed of a ceramic material, internal electrodes formed in the ceramic body, and external electrodes mounted on a surface of the ceramic body to be connected to the internal electrodes.

Among the ceramic electronic components, a multilayer ceramic capacitor includes a plurality of stacked dielectric layers, internal electrodes disposed to face each other, having a dielectric layer therebetween, and external electrodes electrically connected to the internal electrodes.

The multilayer ceramic capacitors have been widely used as components for computers, mobile communications devices such as personal digital assistances (PDAs), mobile phones, and the like, due to advantages such as a small size, high capacitance, easiness of mounting, and the like.

The multilayer ceramic capacitor is generally manufactured using a sheeting method, a printing method, or the like.

Dielectric materials used for high-capacitance multilayer ceramic capacitors and the like, according to the related art, are ferroelectric materials based on barium titanate ($BaTiO_3$), and have high dielectric constant characteristics at room temperature, comparatively low dissipation factor characteristics, and excellent insulation resistance characteristics.

However, the dielectric material, based on barium titanate ($BaTiO_3$), may be problematic in terms of securing reliability with the use thereof, while satisfying X8R characteristics, namely, stable operating characteristics at temperatures of up to 150° C.

Therefore, a material capable of securing reliability while satisfying X8R characteristics, at temperatures of up to 150° C., is in demand.

RELATED ART DOCUMENT

Korean Patent Laid-Open Publication No. KR1999-0075846

SUMMARY

Some embodiments of the present disclosure may provide a novel dielectric ceramic composition capable of securing X8R temperature characteristics and reliability, and a multilayer ceramic capacitor containing the same.

According to some embodiments of the present disclosure, a dielectric ceramic composition may include a base powder (M being configured of Mg and Ti) represented by (1-x) $BaTiO_3$-$xBiMO_3$ containing a first main component represented by $BaTiO_3$ and a second main component represented by $BiMO_3$, wherein x satisfies $0.005 \leq x \leq 0.5$.

According to some embodimetns of the present disclosure, a multilayer ceramic capacitor may include: a ceramic body in which dielectric layers and first and second internal electrodes are alternately stacked; and first and second external electrodes formed on end portions of the ceramic body and electrically connected to the first and second internal electrodes, respectively. The dielectric layer may contain a dielectric ceramic composition containing a base powder (M being configured of Mg and Ti) represented by (1-x) $BaTiO_3$-$xBiMO_3$ containing a first main component represented by $BaTiO_3$ and a second main component represented by $BiMO_3$, and x may satisfy $0.005 \leq x \leq 0.5$.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
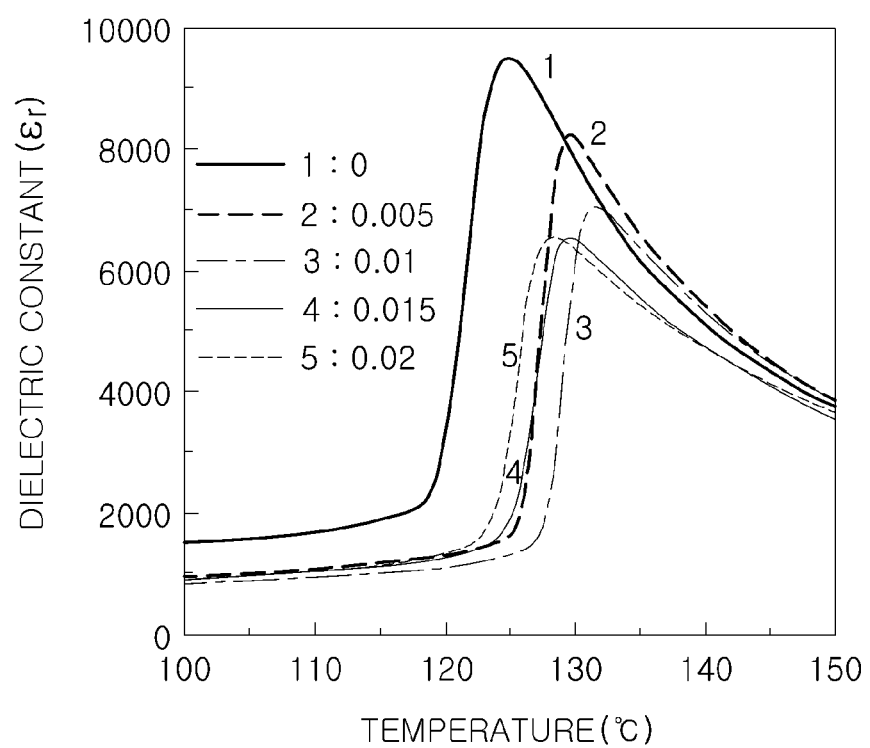
FIG. 1 is a graph illustrating a change in a dielectric constant ($\in_r$) with respect to a temperature of a base powder sintered body represented by (1-x)$BaTiO_3$-$xBiMO_3$ (where M is configured of Mg and Ti) containing a first main ingredient represented by $BaTiO_3$ and a second main component represented by $BiMO_3$.

Embodiments of the inventive concept will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

The present disclosure is directed to a dielectric ceramic composition, and examples of electronic components containing the dielectric ceramic composition may include a capacitor, an inductor, a piezoelectric element, a varistor, a thermistor, and the like. Hereinafter, a dielectric ceramic composition and a multilayer ceramic capacitor as an example of the electronic components will be described.

The dielectric ceramic composition according to an exemplary embodiment of the present disclosure may contain a base powder represented by (1-x)$BaTiO_3$-$xBiMO_3$ (where M is configured of Mg and Ti) containing a first main component represented by $BaTiO_3$ and a second main component represented by $BiMO_3$, wherein x may satisfy $0.005 \leq x \leq 0.5$.

The dielectric ceramic composition according to an exemplary embodiment of the present disclosure may satisfy X5R (−55° C. to 85° C.), X7R (−55° C. to 125° C.), and X8R (−55° C. to 150° C.) characteristics defined by Electronic Industries Association (EIA) standard.

In detail, according to an exemplary embodiment of the present disclosure, a dielectric ceramic composition in which nickel (Ni) is used as a material of an internal electrode and which is capable of being sintered under a reduction atmosphere in which nickel (Ni) is not oxidized at a temperature of 1300° C. or less, may be provided.

In addition, according to an exemplary embodiment of the present disclosure, a multilayer ceramic capacitor using the dielectric ceramic composition may be provided, such that excellent reliability may be achieved as well as satisfying the above-mentioned temperature characteristics.

Hereinafter, respective ingredients of the dielectric ceramic composition according to an exemplary embodiment of the present disclosure will be described in detail.

a) Base Powder

A dielectric ceramic composition according to an exemplary embodiment of the present disclosure may contain a base powder represented by $(1-x)BaTiO_3$-$xBiMO_3$ (where M is configured of Mg and Ti) containing a first main component represented by $BaTiO_3$ and a second main component represented by $BiMO_3$.

In the Equation above, x may satisfy $0.005 \leq x \leq 0.5$.

The first main component may be represented by $BaTiO_3$. Here, $BaTiO_3$ may be a material used as a general dielectric base powder and may be a ferroelectric material having Curie temperature of about 125 degrees.

In addition, the second main component may be represented by $BiMO_3$, wherein M may be configured of Mg and Ti.

M may be represented by $Mg_{1-y}Ti_y$ (where y satisfies $0.4 \leq y \leq 0.6$), and for example, the second main component may be represented by $Bi(Mg_{0.5}Ti_{0.5})O_3$.

The $Bi(Mg_{0.5}Ti_{0.5})O_3$ may be a ferroelectric material having a relatively high Curie temperature (Tc).

For example, the base powder of the dielectric ceramic composition according to an exemplary embodiment of the present disclosure may have the form of a mixture in which a $BaTiO_3$ ferroelectric material having a relatively low Curie temperature is mixed with a ferroelectric material having a relatively high Curie temperature at a predetermined ratio.

According to the exemplary embodiment of the present disclosure, the base powder may be prepared to have a relatively high room temperature dielectric constant and excellent insulation resistance, and in detail, may have X8R (−55° C. to 150° C.) temperature characteristics implemented therein.

For example, the dielectric ceramic composition according to an exemplary embodiment of the present disclosure may guarantee an operation under a high temperature environment of 150° C.

The dielectric ceramic composition according to an exemplary embodiment of the present disclosure may have a room temperature dielectric constant of 2000 or more.

In addition, the base powder of the dielectric ceramic composition may have the above-described mixture in which the materials having different Curie temperatures are mixed with each other, as well as the form of a solid solution.

In the case in which the base powder has the form of a solid solution, the base powder may have a single phase form, and in this case, dielectric constant characteristics, X8R (−55° C. to 150° C.) temperature characteristics, characteristics of a temperature coefficient of capacitance (TCC), low dissipation factor (DF) characteristics, and the like, may be excellent as compared to those of mixtures in which two materials are mixed with each other.

The base powder may be represented by $(1-x) BaTiO_3$-$xBiMO_3$ and may be adjusted to satisfy $0.005 \leq x \leq 0.5$, such that a room temperature dielectric constant may be relatively high and X8R (−55° C. to 150° C.) temperature characteristics may be excellent.

For example, the base powder contains 0.005 to 0.5 mol of $BiMO_3$ (where M is configured of Mg and Ti), a ferroelectric material having a relatively high Curie temperature (Tc), such that the above-described characteristics may be obtained.

In the case in which x is less than 0.005, Curie temperature may be decreased, such that X8R (−55° C. to 150° C.) temperature characteristics may not be implemented.

Meanwhile, in the case in which x is more than 0.5, a room temperature dielectric constant may be decreased, and a dissipation factor (DF) may be increased.

The base powder may have an average particle size of 1000 nm or less, but is not limited thereto.

In general, $CaZrO_3$ and an excessive amount of rare-earth element are added to $BaTiO_3$ in order to satisfy high temperature characteristics (X8R characteristics). However, in this case, even when the high temperature characteristics may be implemented, since the Curie temperature of the base powder itself is 125° C., there may be limitations in improving temperature coefficient of capacitance (TCC).

In addition, reliability may be reduced since a pyrochlore secondary phase is produced by the addition of an excessive amount of rare-earth element.

However, the base powder of the dielectric ceramic composition according to an exemplary embodiment of the present disclosure, which is a mixture or a solid solution in which a ferroelectric material having a relatively high Curie temperature is mixed with or solid-solubilized in $BaTiO_3$ having Curie temperature of about 125 degrees at a predetermined ratio, may satisfy high temperature characteristics (X8R characteristics) and may implement excellent temperature coefficient of capacitance (TCC) characteristics.

b) First Accessory Component

According to an exemplary embodiment of the present disclosure, the dielectric ceramic composition may further contain an oxide or a carbonate containing at least one or more of Mn, V, Cr, Fe, Ni, Co, Cu, or Zn, as a first accessory component.

As the first accessory component, the oxide or the carbonate containing at least one or more of Mn, V, Cr, Fe, Ni, Co, Cu or Zn may be contained in a content of 0.1 to 5.0 mol % based on 100 mol % of the base powder.

The first accessory component may serve to decrease a sintering temperature and improve high temperature withstand voltage characteristics of a multilayer ceramic capacitor to which the dielectric ceramic composition is applied.

The content of the first accessory component and a content of a second accessory component to be described below, the contents contained based on 100 mol % of the base powder, respectively, may be defined by mol % of metal ions contained in respective accessory components.

In the case in which a content of the first accessory component is less than 0.1 mol %, a sintering temperature may be increased and high temperature withstand voltage characteristics may be somewhat deteriorated.

In the case in which a content of the first accessory component is 5.0 mol % or more, high temperature withstand voltage characteristics and room temperature specific resistance may be deteriorated.

In detail, the dielectric ceramic composition according to an exemplary embodiment of the present disclosure may further contain the first accessory component having a content of 0.1 to 5.0 mol % based on 100 mol % of the base powder, such that a relatively low temperature sintering process may be performed and excellent high temperature withstand voltage characteristics may be obtained.

c) Second Accessory Component

According to an exemplary embodiment of the present disclosure, the dielectric ceramic composition may further contain an oxide containing Si or a glass compound containing Si, as a second accessory component.

The dielectric ceramic composition may further contain the second accessory component, which is an oxide containing Si or a glass compound containing Si, in a content of 0.1 to 5.0 mol % based on 100 mol % of the base powder.

As the second accessory component, the oxide containing Si or the glass compound containing Si may be contained in a content of 0.1 to 5.0 mol % based on 100 mol % of the base powder.

The second accessory component may serve to decrease a sintering temperature and improve high temperature withstand voltage characteristics of a multilayer ceramic capacitor to which the dielectric ceramic composition is applied.

In the case in which a content of the second accessory component is less than 0.1 mol % based on 100 mol % of the base powder, a sintering temperature may be increased.

In the case in which a content of the second accessory component is 5.0 mol % or more based on 100 mol % of the base powder, high temperature withstand voltage characteristics may be deteriorated.

In detail, the dielectric ceramic composition according to an exemplary embodiment of the present disclosure may further contain the second accessory component having a content of 0.1 to 5.0 mol % based on 100 mol % of the base powder, such that a relatively low temperature sintering process may be performed and excellent high temperature withstand voltage characteristics may be obtained.

FIG. 1 is a graph illustrating a change in a dielectric constant ($\in_r$) with respect to a temperature of a base powder (where M is configured of Mg and Ti) sintered body represented by $(1-x)BaTiO_3-xBiMO_3$ containing a first main component and a second main component, the first main component being represented by $BaTiO_3$ and the second main component being represented by $BiMO_3$.

Referring to FIG. 1, it may be appreciated that since samples 2 to 5, Inventive Examples of the present disclosure, contain the dielectric ceramic composition provided as a mixture or a solid solution in which a ferroelectric material having a relatively high Curie temperature is mixed with or solid-solubilized in $BaTiO_3$ at a predetermined ratio, Curie temperature may be increased, as compared to sample 1 in which a commercially available X5R dielectric material is applied to $BaTiO_3$ having Curie temperature of 125° C.

Therefore, in the case of a multilayer ceramic capacitor to which the dielectric ceramic composition according to an exemplary embodiment of the present disclosure is applied, high temperature characteristics (X8R characteristics) may be satisfied and excellent temperature coefficient of capacitance (TCC) characteristics may be implemented.

Figure 2:
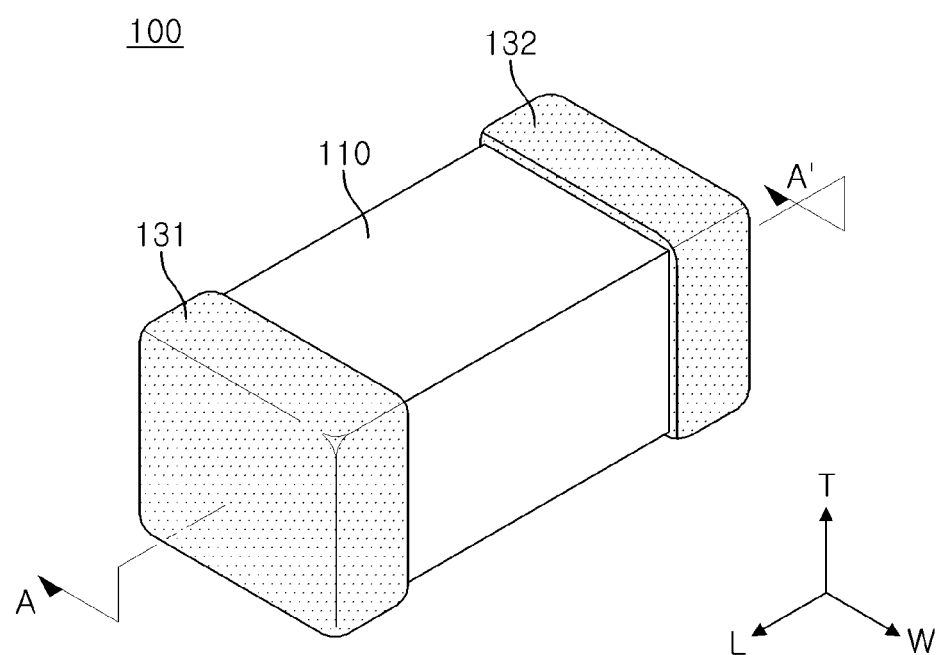
FIG. 2 is a schematic perspective view illustrating a multilayer ceramic capacitor according to an exemplary embodiment of the present disclosure.
Figure 3:
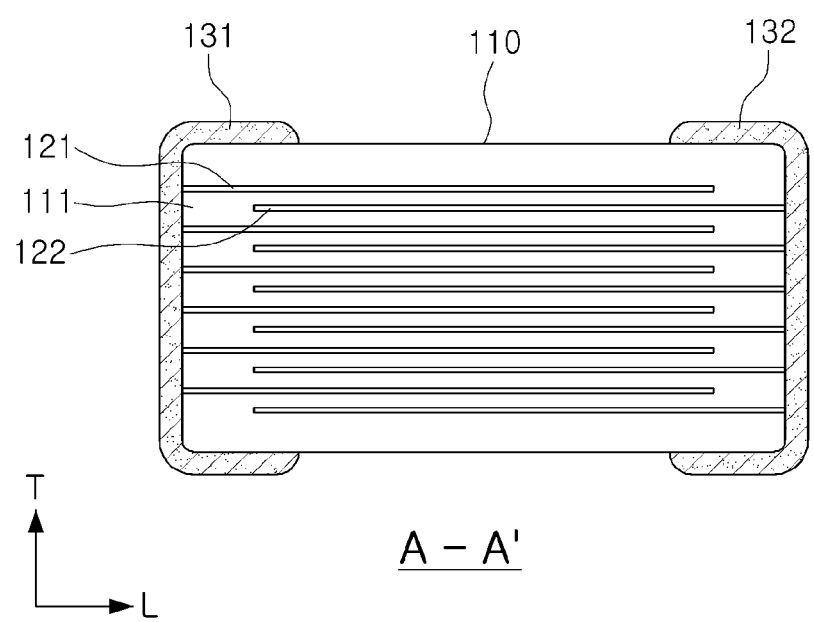
FIG. 3 is a schematic cross-sectional view illustrating the multilayer ceramic capacitor taken along line A-A' of FIG. 2.

FIG. 2 is a schematic perspective view illustrating a multilayer ceramic capacitor 100 according to an exemplary embodiment of the present disclosure, and FIG. 3 is a schematic cross-sectional view illustrating the multilayer ceramic capacitor 100 taken along line A-A' of FIG. 2.

Referring to FIGS. 2 and 3, a multilayer ceramic capacitor 100 according to an exemplary embodiment of the present disclosure may include a ceramic body 110 in which dielectric layers 111 and first and second internal electrodes 121 and 122 are alternately stacked. First and second external electrodes 131 and 132 electrically connected to the first and second internal electrodes 121 and 122 alternately disposed within the ceramic body 110, respectively, may be formed on both end portions of the ceramic body 110.

The ceramic body 110 may have a hexahedral shape, but is not limited thereto. In addition, the ceramic body 110 may have a proper size depending on usage thereof, for example, (0.6~5.6 mm)×(0.3~5.0 mm)×(0.3~1.9 mm), but is not limited thereto.

Further, a thickness of the dielectric layer 111 may be arbitrarily changed depending on a capacitance design of a capacitor. In an exemplary embodiment of the present disclosure, the dielectric layer may have a thickness of 0.2 μm or more per 1 layer after performing a sintering process.

In the case in which the dielectric layer has an extremely reduced thickness, since the amount of crystal grains present in a single layer is relatively small to bring about a negative effect on reliability, the dielectric layer may have a thickness of 0.2 μm or more.

The first and second internal electrodes 121 and 122 may be stacked so that respective ends thereof are alternately exposed to both end surfaces of the ceramic body 110 opposing each other.

The first and second external electrodes 131 and 132 may be formed on both end portions of the ceramic body 110 and be electrically connected to the exposed end surface of the alternately disposed first and second internal electrodes 121 and 122, thereby configuring a circuit of a capacitor.

Conductive materials contained in the first and second internal electrodes 121 and 122 are not particularly limited. However, since the dielectric layer according to an exemplary embodiment of the present disclosure contains a mixture or a solid solution in which a paraelectric material is mixed with or solid-solubilized in a ferroelectric material, nickel (Ni) may be used as the conductive material.

Each thickness of the first and second internal electrodes 121 and 122 may be determined to be appropriate therefor depending on usage thereof, or the like, for example, 0.1 to 5 μm or 0.1 to 2.5 μm, but is not limited thereto.

A conductive material contained in the first and second external electrodes 131 and 132 may be nickel (Ni), copper (Cu), or an alloy thereof, but is not limited thereto.

Each thickness of the first and second external electrodes 131 and 132 may be determined to be appropriate therefor depending on usage thereof, or the like, for example, 10 to 50 μm, but is not limited thereto.

The dielectric layers 111 configuring the ceramic body 110 may contain the dielectric ceramic composition according to an exemplary embodiment of the present disclosure.

The dielectric ceramic composition may contain a base powder (where M is configured of Mg and Ti) represented by $(1-x)BaTiO_3-xBiMO_3$ containing a first main component and a second main component represented by $BaTiO_3$ and the second main component represented by $BiMO_3$, wherein x may satisfy $0.005 \leq x \leq 0.5$.

Hereinafter, although the present disclosure will be described in detail through Inventive Example and Comparative Example, the descriptions are provided to assist in the understanding of the present disclosure, and thus, a scope of the present disclosure is not limited to the following Inventive Examples.

A raw material powder containing $(1-x) BaTiO_3-xBi(Mg_{0.5}Ti_{0.5})O_3$ as a main component was prepared by applying a solid phase method thereto as described below.

Starting raw materials, $BaCO_3$, $TiO_2$, $Bi_2O_3$, and $MgCO_3$, were dispersed in ethanol and mixed with together according to a respective composition ratio shown in the following Table 1.

The mixed powder particles were subjected to calcination in a temperature range of from 950 to 1050° C. in the air atmosphere to prepare a main component powder having an average particle size of 300 nm.

Then, after $MnO_2$ and $SiO_2$ powders, accessory additives, were added to the first main component powder according to the composition ratio shown in the following Table 1, the raw material powder particles containing the main component and the accessory component are mixed such that ethanol/toluene, a dispersing agent, and a binder were mixed with together, using zirconia balls as mixing/dispersing media, followed by a ball-milling process for 20 hours, thereby preparing a slurry.

The prepared slurry was molded to be a sheet having a thickness of about 10 μm, using a small sized coater in a doctor blade scheme.

Nickel (Ni) internal electrodes were printed on the sheet having a thickness of about 10 μm.

Upper and lower cover layers were manufactured by stacking 25 layers of molded sheets having each thickness of 10 to 13 μm and an active layer was manufactured by stacking 21 layers of sheets having each thickness of about 2.0 μm and internal electrodes printed thereon, thereby manufacturing a bar.

The compressed bar was cut into chips to have a 3216 size (length×width×thickness of 3.2 mm×1.6 mm×1.6 mm), by a cutter.

The obtained chip was plasticized and sintered under a reduction atmosphere (0.1% of $H_2$/99.9% of $N_2$, $H_2O/H_2/N_2$ atmosphere) at a temperature of 1200 to 1300° C. for 2 hours, and was then subjected to a heat treatment under a nitrogen ($N_2$) atmosphere at a temperature of 1000° C. for 3 hours, for reoxidation.

The sintered chip was subjected to a termination process with copper (Cu) paste, followed by an electrode sintering process, thereby completing an external electrode.

This completed prototype MLCC sample was evaluated in view of capacitance, DF, insulation resistance, TCC, and resistance deterioration behavior, depending on a voltage step increase at a high temperature of 150° C., or the like.

Room temperature capacitance and dielectric loss of the MLCC chip were measured under conditions of 1 kHz and 0.2 V/μm of AC, using an LCR-meter.

A dielectric constant of the MLCC chip was calculated from capacitance, a thickness of the dielectric layer of the MLCC chip, an area of the internal electrodes, and the number of stacked layers.

In 10 samples, room temperature insulation resistance (IR) was measured after 10V/μm of DC was applied thereto for 60 seconds.

The TCC depending on temperature was measured in a temperature range from −55° C. to 150° C.

In a high temperature IR voltage-boost test, resistance deterioration behavior thereof was measured by increasing each voltage step by 5 V/μm at 150° C., and was required 10 minutes for a respective step, while resistance values were measured at 5-second intervals.

A high temperature withstand voltage was deduced from the high temperature IR voltage-boost test, and IR indicated a level of voltage resistant to a $10^5 \Omega$ or higher when the resistance value was measured by applying a voltage step of 5V/μm of DC to a 3216 sized-chip having a 20-layer dielectric structure with a thickness of 7 μm, at 150° C., for 10 minutes, to continuously increase the voltage step, after performing a sintering process thereon.

TABLE 1

| | Molar Ratio of Each Component of Base powder | | | Number of Moles of Each Accessory Component Per 100 Mol of Base powder | |
|---|---|---|---|---|---|
| | $(1-x) BaTiO_3 - xBi(Mg_{1-y}Ti_y)O_3$ | | | First | Second |
| | First Main Component | Second Main Component | | Accessory Component | Accessory Component |
| | $(1-x) BaTiO_3$ | $xBi(Mg_{1-y}Ti_y)O_3$ | y | $MnO_2$ | $SiO_2$ |
| *1 | 1.000 | 0.000 | 0.500 | 0.50 | 0.50 |
| 2 | 0.995 | 0.005 | 0.500 | 0.50 | 0.50 |
| 3 | 0.990 | 0.010 | 0.500 | 0.50 | 0.50 |
| 4 | 0.985 | 0.015 | 0.500 | 0.50 | 0.50 |
| 5 | 0.980 | 0.020 | 0.500 | 0.50 | 0.50 |
| 6 | 0.975 | 0.025 | 0.500 | 0.50 | 0.50 |
| 7 | 0.950 | 0.050 | 0.500 | 0.50 | 0.50 |
| 8 | 0.900 | 0.100 | 0.500 | 0.50 | 0.50 |
| 9 | 0.800 | 0.200 | 0.500 | 0.50 | 0.50 |
| 10 | 0.700 | 0.300 | 0.500 | 0.50 | 0.50 |
| 11 | 0.600 | 0.400 | 0.500 | 0.50 | 0.50 |
| 12 | 0.500 | 0.500 | 0.500 | 0.50 | 0.50 |
| *13 | 0.990 | 0.010 | 0.500 | 0.00 | 0.50 |
| 14 | 0.990 | 0.010 | 0.500 | 0.10 | 0.50 |
| 15 | 0.990 | 0.010 | 0.500 | 0.30 | 0.50 |
| 16 | 0.990 | 0.010 | 0.500 | 1.00 | 0.50 |
| 17 | 0.990 | 0.010 | 0.500 | 2.00 | 0.50 |
| 18 | 0.990 | 0.010 | 0.500 | 3.00 | 0.50 |
| *19 | 0.990 | 0.010 | 0.500 | 5.00 | 0.50 |
| *20 | 0.990 | 0.010 | 0.500 | 0.50 | 0.00 |
| 21 | 0.990 | 0.010 | 0.500 | 0.50 | 0.10 |
| 22 | 0.990 | 0.010 | 0.500 | 0.50 | 1.00 |
| 23 | 0.990 | 0.010 | 0.500 | 0.50 | 2.00 |
| 24 | 0.990 | 0.010 | 0.500 | 0.50 | 3.00 |
| *25 | 0.990 | 0.010 | 0.500 | 0.50 | 5.00 |
| *26 | 0.990 | 0.010 | 0.300 | 0.50 | 0.50 |
| 27 | 0.990 | 0.010 | 0.400 | 0.50 | 0.50 |
| 28 | 0.990 | 0.010 | 0.600 | 0.50 | 0.50 |
| *29 | 0.990 | 0.010 | 0.700 | 0.50 | 0.50 |

*Comparative Example

The following Table 2 shows characteristics of the prototype MLCC chip corresponding to compositions indicated by Table 1 above.

TABLE 2

| Sample | Sintering Temperature (° C.) | Room Temperature Dielectric Constant | DF (%) | Room Temperature Specific Resistance (Ω-cm) | TCC (%) (−55° C.) | TCC (%) (125° C.) | TCC (%) (150° C.) | High Temperature Withstand Voltage (150° C.) (V) |
|---|---|---|---|---|---|---|---|---|
| *1 | 1250.0 | 2856.0 | 3.520 | 8.221E+12 | −13.20 | −12.40 | −35.20 | 70 |
| 2 | 1250.0 | 2638.0 | 3.710 | 6.518E+12 | −13.40 | −11.30 | −14.90 | 70 |
| 3 | 1250.0 | 2461.0 | 3.940 | 5.408E+12 | −13.80 | −3.50 | −9.50 | 75 |
| 4 | 1250.0 | 2455.0 | 4.030 | 4.922E+12 | −13.90 | −3.80 | −10.40 | 70 |
| 5 | 1250.0 | 2378.0 | 4.110 | 4.899E+12 | −14.20 | −4.20 | −10.60 | 65 |
| 6 | 1250.0 | 2320.0 | 4.180 | 4.759E+12 | −14.60 | −4.50 | −12.70 | 55 |
| 7 | 1250.0 | 2155.0 | 5.740 | 3.646E+12 | −14.40 | −5.70 | −13.20 | 50 |

TABLE 2-continued

| Sample | Sintering Temperature (° C.) | Room Temperature Dielectric Constant | DF (%) | Room Temperature Specific Resistance (Ω-cm) | TCC (%) (−55° C.) | TCC (%) (125° C.) | TCC (%) (150° C.) | High Temperature Withstand Voltage (150° C.) (V) |
|---|---|---|---|---|---|---|---|---|
| 8 | 1250.0 | 2234.0 | 6.290 | 1.695E+12 | −10.40 | −6.40 | −15.00 | 45 |
| 9 | 1250.0 | 2506.0 | 7.330 | 9.773E+11 | −9.50 | −6.20 | −14.20 | 40 |
| 10 | 1250.0 | 2125.0 | 8.210 | 8.581E+11 | −8.44 | −5.80 | −13.80 | 40 |
| 11 | 1250.0 | 1560.0 | 9.060 | 9.581E+10 | −7.23 | −3.60 | −12.40 | 40 |
| 12 | 1250.0 | 854.0 | 11.250 | 4.581E+10 | −6.58 | −2.10 | −10.10 | 35 |
| *13 | 1250.0 | 3056.0 | 6.880 | 4.328E+06 | −10.90 | −4.50 | −11.80 | 5 |
| 14 | 1250.0 | 2812.0 | 5.710 | 6.354E+10 | −14.10 | −4.10 | −12.30 | 35 |
| 15 | 1250.0 | 2538.0 | 4.620 | 2.690E+12 | −14.20 | −3.80 | −10.20 | 40 |
| 16 | 1300.0 | 2006.0 | 2.410 | 8.308E+12 | −12.80 | −2.40 | −8.80 | 75 |
| 17 | 1280.0 | 1645.0 | 2.260 | 6.335E+11 | −11.60 | −2.30 | −8.50 | 75 |
| 18 | 1250.0 | 1432.0 | 2.070 | 2.407E+11 | −11.20 | −2.10 | −8.20 | 70 |
| *19 | 1250.0 | 1333.0 | 1.930 | 9.408E+10 | −10.40 | −1.90 | −7.70 | 60 |
| *20 | 1290.0 | 2473.0 | 3.990 | 5.688E+12 | −13.70 | −3.80 | −10.10 | 60 |
| 21 | 1250.0 | 2463.0 | 3.820 | 6.408E+12 | −13.10 | −3.60 | −9.20 | 60 |
| 22 | 1270.0 | 2388.0 | 3.640 | 7.408E+12 | −12.80 | −2.50 | −8.50 | 0 |
| 23 | 1250.0 | 2334.0 | 3.550 | 6.408E+12 | −11.80 | −2.30 | −8.40 | 60 |
| 24 | 1250.0 | 2259.0 | 3.200 | 5.310E+12 | −11.70 | −2.20 | −8.10 | 60 |
| *25 | 1290.0 | 2065.0 | 2.870 | 4.350E+12 | −10.30 | −2.00 | −7.90 | 50 |
| *26 | 1250.0 | 1846.0 | 1.830 | 6.208E+12 | −11.80 | −12.50 | −19.50 | 35 |
| 27 | 1250.0 | 2245.0 | 2.880 | 6.216E+12 | −12.30 | −11.10 | −14.50 | 55 |
| 28 | 1250.0 | 3223.0 | 7.740 | 3.480E+11 | −10.70 | −10.50 | −15.00 | 40 |
| *29 | 1250.0 | 12567.0 | 33.6 | 2.572E+05 | — | — | — | 5 |

*Comparative Example

Referring to Tables 1 and 2, Comparative Example 1 and Inventive Examples 2 to 12 show characteristics of the prototype chips depending on a change in 1-x indicating a content of the first main component (BT) and in x indicating a content of the second main component (BiMT) when the first accessory component $MnO_2$ and the second accessory component $SiO_2$ have a content of 0.5 mol % and 0.5 mol %, respectively, based on 100 mol % of the base powder represented by $(1-x)BaTiO_2-xBi(Mg_{0.5}Ti_{0.5})O_3$.

As x is gradually increased from 0 to 0.05, the dielectric constant is gradually decreased, and thus, in a sample (Inventive Example 7) in which x is 0.05, the dielectric constant thereof is 2155. When x values are larger than 0.05, the dielectric constant is increased again and then decreased, and in a sample in which x is 0.2, the dielectric constant thereof is 2506, and in a sample in which x is 0.5, the dielectric constant thereof is about 854.

In view of high temperature withstand voltage characteristics, Inventive Example 3 showed the maximum value of 75V/um when the BiMT content, x, satisfies x=0.01, and as x is increased, the high temperature withstand voltage characteristics tend to be gradually decreased, and when x=0.5, the high temperature withstand voltage has a level of 35V/um.

Therefore, the content of BiMT, x, may be within a range of 0.5 or less in consideration of high temperature withstand voltage characteristics.

In Sample 1 in which x=0, for example, BiMT is not added thereto (Comparative Example 1), TCC (150° C.) is −35.4%, and thus, X8R standard may not be satisfied.

However, it can be appreciated that when the BiMT content is within a range of x=0.005 to 0.5 (Inventive Examples 2 to 12), TCC (150° C.) is within a range of ±15% and X8R temperature characteristics may be implemented.

Therefore, in order to implement X8R characteristics, the BiMT content, x, may be 0.005 or more.

Therefore, in consideration of the dielectric constant, the high temperature withstand voltage, and TCC characteristics, from the results of tests performed on Samples 2 to 12, it could be judged that x, a BiMT content, is within a range of 0.005 to 0.5 for implementing X8R characteristics, and in Sample 3 (Inventive Example 3) to which a condition of x=0.01 is applied, the maximum characteristics in terms of the dielectric constant, the high temperature withstand voltage and TCC characteristics may be implemented.

Referring to Tables 1 and 2, Samples 13 to 19 (Comparative Examples 13, 19 and Inventive Examples 14 to 18) show characteristics of the prototype chips depending on a change in a content of the first accessory component $MnO_2$ when the content of the second main component BiMT, x, satisfies x=0.01, and the second accessory component $SiO_2$ has a content of 0.5 mol % based on the base powder.

It could be appreciated that in Sample 13 in which Mn has a content of 0 (Comparative Example 13), the room temperature specific resistance value was significantly low as 4.328E+06, and when Mn has a content of 0.1 (Inventive Example 14) or more, insulation characteristics of 1.000E+10 or more were implemented.

As the content of Mn is increased, the dielectric constant is continuously decreased, and thus, in Sample 19 in which Mn has a content of 0.05 (Comparative Example 19), the dielectric constant thereof is 1333, and the high temperature withstand voltage characteristics may be somewhat deteriorated.

Therefore, in consideration of the dielectric constant, the high temperature withstand voltage, TCC characteristics, from results of Samples 13 to 19, the Mn content may be selected to be within a range of 0.1 to 5 mol % when the BiMT content, x, satisfies x=0.01 and $SiO_2$ has a content of 0.5 mol % based on the base metal material.

Referring to Tables 1 and 2, Samples 20 to 25 (Comparative Examples 20 and 25, and Inventive Examples 21 to 24) show prototype chip characteristics depending on a change in a content of the second accessory component $SiO_2$ when the content of the second main component BiMT, x, satisfies x=0.01, and the first accessory component $MnO_2$ has a content of 0.5 mol % based on the base powder.

In Sample 20 in which $SiO_2$ is present in an amount of 0 (Comparative Example 20), a problem in which the sintering temperature is increased to a temperature of about 1290° C.

occurs, while in Samples to which $SiO_2$ is added (Inventive Examples 21 to 24), the sintering temperature is decreased to improve sinterability.

In the case in which $SiO_2$ is present in an excessive amount of 5 mol % (Comparative Example 25), an improvement in sinterability is less exhibited, and the dielectric constant and the high temperature withstand voltage may be deteriorated.

Therefore, the $SiO_2$ content may be selected to be within a range of 0.1 to 5 mol % when considering the dielectric constant, the high temperature withstand voltage, and TCC characteristics, and sinterability from the results of Samples 20 to 25.

Referring to Tables 1 and 2, Samples 26 to 29 (Comparative Examples 26 and 29 and Inventive Examples 27 and 28) show characteristics of the prototype chips depending on y, a Ti content in the second main component represented by $Bi(Mg_{1-y}Ti_y)O_3$ (BiMT), when the content of the second main component BiMT, x, satisfies x=0.01, and the first accessory component $MnO_2$ and the second accessory component $SiO_2$ have the content of 0.5 mol % and 0.5 mol %, respectively, based on the base powder.

Based on the Ti content, y, satisfying y=0.5, in the second main component represented by $Bi(Mg_{1-y}Ti_y)O_3$, as y is decreased to 0.4 (Inventive Example 27) and 0.3 (Comparative Example 26), the dielectric constant is decreased and the high temperature withstand voltage characteristics may be deteriorated. In addition, based on the Ti content, y, satisfying y=0.5, as y is increased to 0.6 (Inventive Example 28) and 0.7 (Comparative Example 29), reduction resistance may be deteriorated, and thus, DF values are increased and the room temperature specific resistance values are rapidly decreased.

Therefore, from results of Samples 26 to 29, the Ti content, y, may be selected to be within a range of 0.4 to 0.6 when considering the dielectric constant, the high temperature withstand voltage, and the room temperature specific resistance values.

According to exemplary embodiments of the present disclosure, due to an increase in Curie temperature of a base powder and a uniform dielectric constant of a high temperature part, the dielectric ceramic composition capable of satisfying X8R temperature characteristics and having excellent high temperature withstand voltage characteristics, and the multilayer ceramic capacitor containing the same, may be provided.

While exemplary embodiments have been shown and described above, it will be apparent to those skilled in the art that modifications and variations could be made without departing from the spirit and scope of the present disclosure as defined by the appended claims.

What is claimed is:

1. A dielectric ceramic composition comprising a base powder (M being configured of Mg and Ti) represented by $(1-x)BaTiO_3-xBiMO_3$ containing a first main component represented by $BaTiO_3$ and a second main component represented by $BiMO_3$, wherein x satisfies $0.005 \leq x \leq 0.5$, 0.1 to 5.0 mol % of a first accessory component, an oxide or a carbonate containing at least one of Mn, V, Cr, Fe, Ni, Co, Cu and Zn, based on 100 mol % of the base powder, and 0.1 to 5.0 mol % of a second accessory component, an oxide containing Si or a glass compound containing Si, based on 100 mol % of the base powder.

2. The dielectric ceramic composition of claim 1, wherein M is represented by $Mg_{1-y}Ti_y$ (where y satisfies $0.4 \leq y \leq 0.6$).

3. The dielectric ceramic composition of claim 1, wherein the first main component and the second main component are a solid solution.

4. A multilayer ceramic capacitor comprising:
   a ceramic body in which dielectric layers and first and second internal electrodes are alternately stacked; and
   first and second external electrodes disposed on end portions of the ceramic body and electrically connected to the first and second internal electrodes, respectively,
   wherein the dielectric layer contains a dielectric ceramic composition containing a base powder (M being configured of Mg and Ti) represented by $(1-x)BaTiO_3-xBiMO_3$ containing a first main component represented by $BaTiO_3$ and a second main component represented by $BiMO_3$, and x satisfies $0.005 \leq x \leq 0.5$, 0.1 to 5.0 mol % of a first accessory component, an oxide or a carbonate containing at least one of Mn, V, Cr, Fe, Ni, Co, Cu and Zn, based on 100 mol % of the base powder, and 0.1 to 5.0 mol % of a second accessory component, an oxide containing Si or a glass compound containing Si, based on 100 mol % of the base powder.

5. The multilayer ceramic capacitor of claim 4, wherein M is represented by $Mg_{1-y}Ti_y$ (where y satisfies $0.4 \leq y \leq 0.6$).

6. The multilayer ceramic capacitor of claim 4, wherein the first main component and the second main component are a solid solution.

7. The dielectric ceramic composition of claim 1, wherein a room temperature permittivity is 2000 or more, a temperature coefficient of capacitance at 150° C. is between −15% and +15%, and a withstand voltage at 150° C. is 50 V/μm or more.

8. The dielectric ceramic composition of claim 7, wherein the room temperature permittivity is 2500 or more.

9. The dielectric ceramic composition of claim 7, wherein the temperature coefficient of capacitance at 150° C. is between −10% and +10%.

10. The dielectric ceramic composition of claim 7, wherein the withstand voltage at 150° C. is 75 V/μm or more.

* * * * *